May 9, 1933.    C. E. REED    1,908,049
ROTARY BORING DRILL FOR DEEP WELLS
Filed April 4, 1929    2 Sheets-Sheet 1

INVENTOR:
Clarence E. Reed,
BY
ATTORNEYS

May 9, 1933.  C. E. REED  1,908,049
ROTARY BORING DRILL FOR DEEP WELLS
Filed April 4, 1929  2 Sheets-Sheet INVENTOR:
*Clarence E. Reed,*
BY
ATTORNEYS Patented May 9, 1933

1,908,049

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

ROTARY BORING DRILL FOR DEEP WELLS

Application filed April 4, 1929. Serial No. 352,462.

One object of the invention is to provide means for clearing the cone shaped toothed roller cutters of sticky material which would otherwise collect in the grooves between the circumferential rows of teeth. The invention will be shown in connection with the form of two cone boring drills such as disclosed by me in various patents such as Nos. 1,636,665 and 1,692,793 granted respectively July 19, 1927 and Nov. 20, 1928.

In these patents roller cutter units are insertable into or removable from the bit head by a movement substantially parallel with the axis of the drill apparatus, each unit having mounted thereon as a part thereof a frusto-conical toothed cutter. There are a pair of these and they are so juxtaposed on opposite sides of the vertical axis of the drill head as to cut the entire area at the bottom of the well.

The invention consists in the features and combination and arrangement of parts hereinafter described and particularly pointed out in the appended claims.

Figure 1:
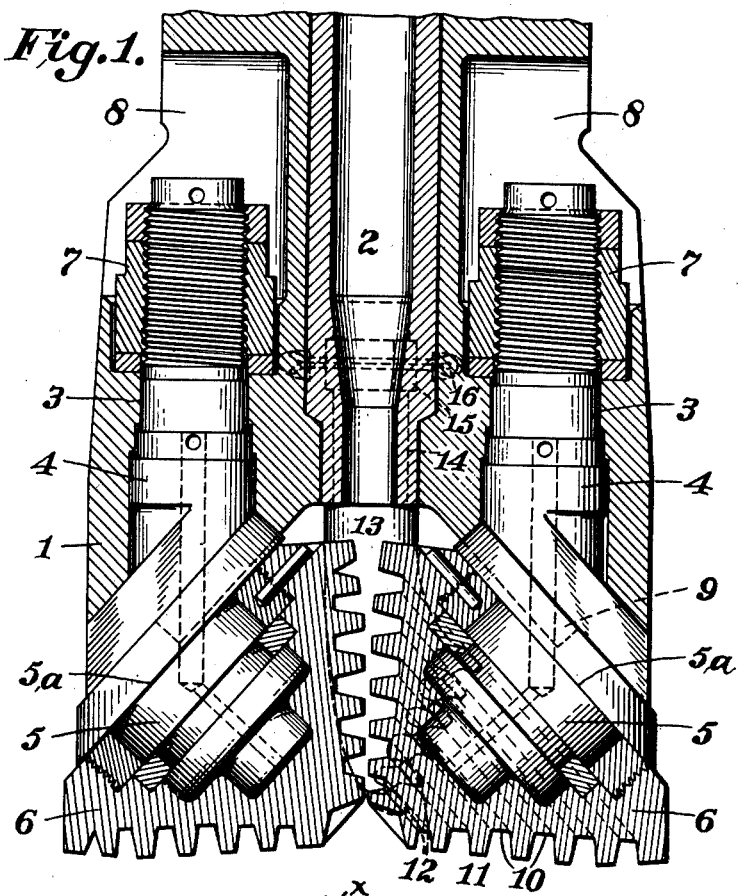
Figure 1 is a central vertical sectional view of a rotary cutter boring tool embodying my invention.

In these drawings 1 is a bit head, of one piece, having a central course 2 for flushing fluid, and sockets 3 in which are located the shanks 4 of the roller cutter units which comprise in addition to the said shanks the spindles 5 with base flange 5a and a toothed roller cutter 6. The unit is held in the socket by fastening means at 7 like in Patent No. 1,692,793 above mentioned. These units are readily removable from the bit head by removing the fastening devices at 7, these being accessible for removal or replacement through a lateral recess 8 of the bit head in which they are located. The lower face of the bit head has an inverted V shaped recess and in the walls thereof are seat recesses 9 for receiving the base flanges 5a of the units. These roller cutter units are so related that their frusto-conical toothed cutters lie on opposite sides of the vertical axis of the boring apparatus and in close proximity thereto so that when the boring tool is rotated about its vertical axis the frusto-conical cutters will cut the entire area at the bottom of the hole. The cutters in large measure occupy the space of the inverted V shaped recess.

In replacing a cutter unit it is moved substantially parallel with the vertical axis of the bit head so that its shank will enter the socket in the head, and the flange 5a will enter the seat recess and thus the unit will be located and held in prescribed relation to the head and to each other.

In order to clear the cutters of accumulation of sticky material which if not removed would interfere with the penetration of the cutter teeth into the formation at the bottom of the hole, I have provided scraper means to extend into the grooves 10 between the circumferential rows of cutter teeth 11 to clear away any material which might have a tendency to pack therein.

Figure 2:
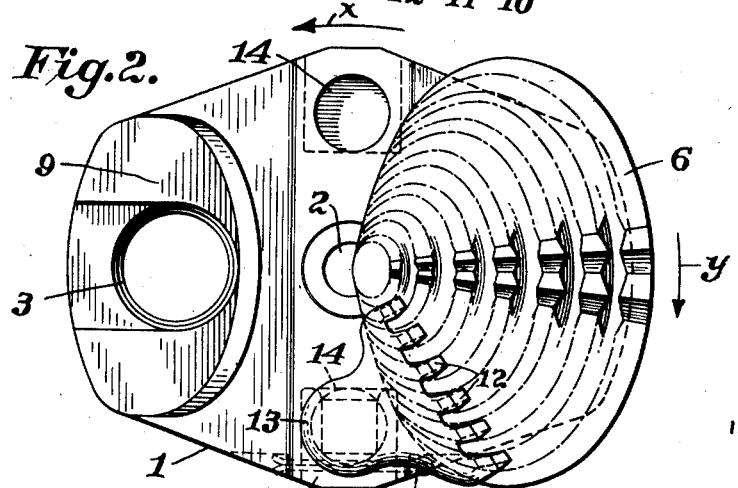
Fig. 2 is a bottom plan view of Fig. 1 with one of the roller cutter units omitted.
Figure 6:
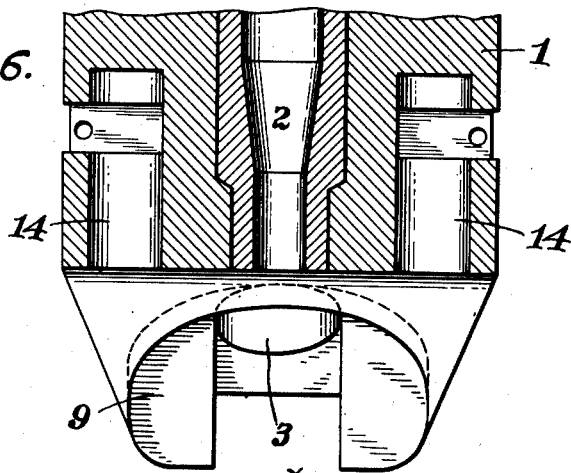
Fig. 6 is a detail view.
Figure 4:
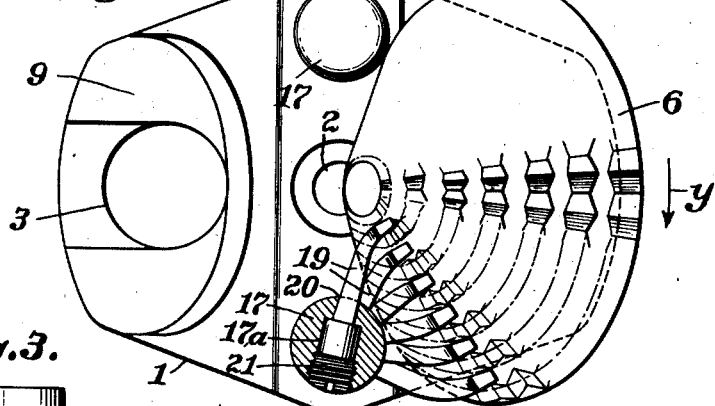
Fig. 4 is a view similar to Fig. 2 of a modified form of the invention.
Figure 3:
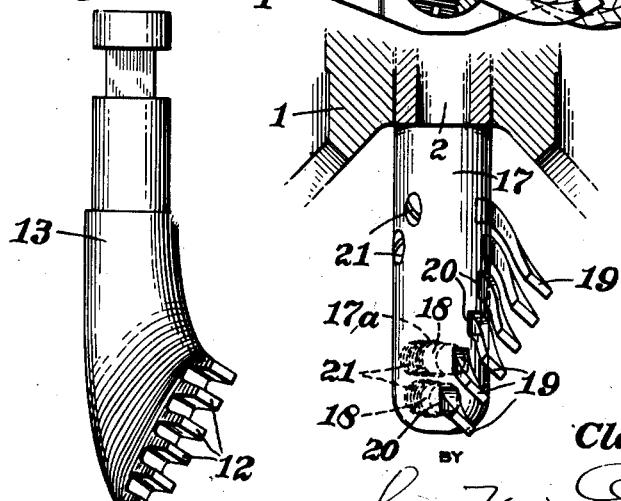
Fig. 3 is a detail view of one of the scraper members.
Figure 5:
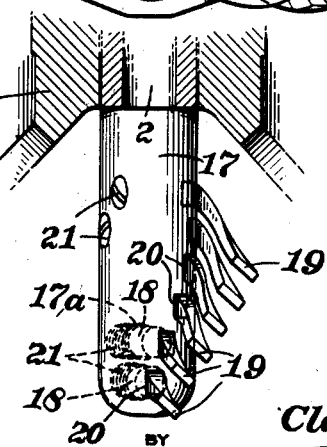
Fig. 5 is a view of the scraper portion of the organization shown in Fig. 4.

This scraper means in the form shown in Figs. 1, 2 and 3 consists of a series of scraper teeth or projections 12 carried by a hanger 13 which extends down from the bit head into the inverted V shaped recess thereof, said hanger being held in a socket in the bit head at 14. A suitable holding means may consist of a yoke shaped locking member 15 and a cotter pin 16. While a single hanger can be arranged to clear the teeth of both cone cutters, it is preferable to use two of them as shown, each having a series of scraped teeth carried thereby. One of these hangers with its teeth is used for each cone cutter. They are placed in position after the roller cutter units are inserted by moving them up into their sockets, and securing them by the means above mentioned.

These scraper units are inserted after the roller cutter by a movement up into the bit head substantially parallel with the vertical axis thereof, and they are caused to engage their teeth or clearer projections in the circumferential grooves of the cutters. They are located on the rear or trailing side of the cutters relative to the direction of rotary motion of the head so that the grooves of each cone are cleared by the scraper projections, as the cutting surfaces of the cones rise from the bottom of the hole.

One set of clearer or scraper projections are carried by one hanger and the other by the other hanger, each hanger as before stated being on the rear or trailing side of the cutter as it traverses its orbital path around the vertical axis of the drill head. The scraper projections are in a row inclined towards the vertical axis of the drill to conform to the inclined face of the conical form of the roller cutter.

The hangers are arranged in the central vertical plane lying at right angles to the vertical plane in which the axes of the cones lie, and they are on opposite sides of the axis of the central flushing fluid conduit so that they act to confine the flushing fluid against undue escape laterally from the inverted V shaped recess, and thus cause it to act upon the toothed surfaces of the conical roller cutters. The effect of the scraping action of the scraper projections and the flushing fluid is to clear the teeth of the cut material and is of great importance in sticky formations. By reason of clearing the grooves and teeth the said teeth will penetrate the formation to their full depth and thus full efficiency in the action of the teeth is maintained.

As before stated, the scrapers are on the rear or trailing side of the cone cutters in respect to the direction of orbital travel of said cutters and thus they are on what may be termed the rising side of said cutters, that is, the side which rises from the ground after performing the cutting function. The accumulation which is cleared from the cutter by the scrapers thus is caused to be deposited at the rear side of the cutter, where it is left to be washed away by the flushing fluid.

Instead of providing removable hangers with the scraper teeth thereon I may employ removable teeth seated in a support integral with the one piece bit head. This support is in the form of a projection extending down from the upper wall of the inverted V shaped recess, one of said integral supports or hangers being provided on the rear of the trailing side of each roller cutter. These integral supports, or hangers 17, have counterbored pockets therein as shown at 17a which receive the body portions 18 of the scrapers. From these body portions the scraper blades or projections 19 extend out through openings 20 in the end wall of the counterbored pockets and these scraper blades are rectangular in cross section. The openings 20 are formed to correspond to the rectangular cross sectional shape of the scraper blades. These blades are of less cross sectional area than their respective body portions. They project from the support into the grooves of the roller to act in a manner similar to the scrapers first mentioned. They are inserted into place from the trailing side of the supports, it being understood that the head as a whole rotates in the direction of the arrow $x$ and the cutter roller rotates in the direction of the arrow $y$. They are held in the pockets of the supports by screw plugs 21. The supports are adjacent the side faces of the drill head and are accessible through the inverted V shaped recess of the head. The integral supports are so located as not to interfere with the free insertion of the roller cutter units and after these units are in place then the scraper elements are inserted in the pockets of the supports and held by the screw plugs.

It will be seen from the above that the organization is such that the roller cutter units can be removed and replaced without interference with the scraper organization and on the other hand the scraper organization can be removed and replaced without interfering with the roller cutter organization and that whatever construction of roller cutter organization may be used the scrapers are arranged in such position relative thereto to perform the scraping function efficiently, and preferably this relation, as stated above, is that the scrapers are located on the trailing side of the cutters where their cutting surfaces are rising out of the ground.

I do not limit myself to the exact roller cutter organization disclosed herein.

If the circumferential grooves of the roller cutters are undercut the hanger in the first described form may be rotated slightly after or while being seated in its socket so that the scraper blades or projections locate themselves in the grooves under the overhanging wall thereof and the shank of the hanger may be square in cross section so that when turned to the proper point the yoke shaped locking piece will hold the hanger against rotary displacement.

I claim:

1. A scraper unit for the roller cutter of an earth boring bit having an inverted V-shaped recess at its lower end in which the cutter is mounted comprising a hanger depending from the apex of said recess and a series of projections extending angularly therefrom to enter the grooves between the rows of cutting teeth of said cutter.

2. A boring drill comprising a bit head having an inverted V-shaped recess at its lower end, a roller cutter unit including a cutter having rows of cutting teeth on each side of the vertical axis of the drill and insertable into and removable from the slanting sides of said recess by a movement along lines substantially parallel to the vertical axis of the drill head, and a scraper arrangement for said roller cutters comprising a scraper member on each side of the vertical axis of the drill bit and of the diametrical line passing through said cutter members, said scraper units depending from said head in parallelisms with the vertical axis of the same and having series of projections extending angularly therefrom to enter the grooves between the rows of cutting teeth on said roller cutters.

3. A boring drill comprising a bit head having an inverted V-shaped recess at its lower end, a roller cutter unit rotatably supporting a cutter having rows of cutting teeth on each side of the vertical axis of the drill and insertable into and removable from the slanting sides of said recess by a movement along lines substantially parallel to the vertical axis of the drill head, and a scraper unit for each roller cutter comprising a hanger depending vertically from said head within said recess and having scraper members projecting laterally and angularly therefrom into the grooves between the cutting teeth of the adjacent roller cutter.

4. A boring drill comprising a bit head having an inverted V-shaped recess at its lower end, a roller cutter unit rotatably supporting a cutter having rows of cutting teeth on each side of the vertical axis of the drill and insertable into and removable from the slanting sides of said recess by a movement along lines substantially parallel to the vertical axis of the drill head, and a scraper unit for each roller cutter comprising a hanger depending vertically from the apex of said recess and having scraper members projecting laterally and angularly therefrom into the grooves between the cutting teeth of the adjacent roller cutter, said members being individually secured to said hanger for convenient adjustment and replacement.

5. A bit head having an inverted V-shaped recess in its lower end constructed and arranged to mount cone cutters in opposed relation within said recess, and a scraper member depending vertically within said recess from the apex portion thereof and having laterally extending members to clean the grooves between the cutting teeth of the cone cutters.

6. A bit head having an inverted V-shaped recess in its lower end constructed and arranged to mount roller cutters therein, and a scraper unit comprising a support integral with said head extending vertically within said recess and scraper elements individually mounted upon said support for adjustment and replacement and projecting laterally and angularly therefrom.

7. A bore forming tool including a head having oppositely disposed frusto-conical, abrading rollers rotatably mounted thereon and whose axes converge downwardly, said rollers having external teeth and annular, peripheral grooves therearound separating the teeth into series, anchors having elongated shanks extending longitudinally of, and secured to, the head whose lower ends are free and project downwardly and extend inwardly between said rollers, said anchors having spaced, laterally extending projections which project into said grooves.

In testimony whereof, I affix my signature.

CLARENCE E. REED.